March 22, 1955 S. SAWIJALOW 2,704,403
COMBINED MICROMETER GAUGE AND DEPTH GAUGE
Filed Feb. 19, 1953
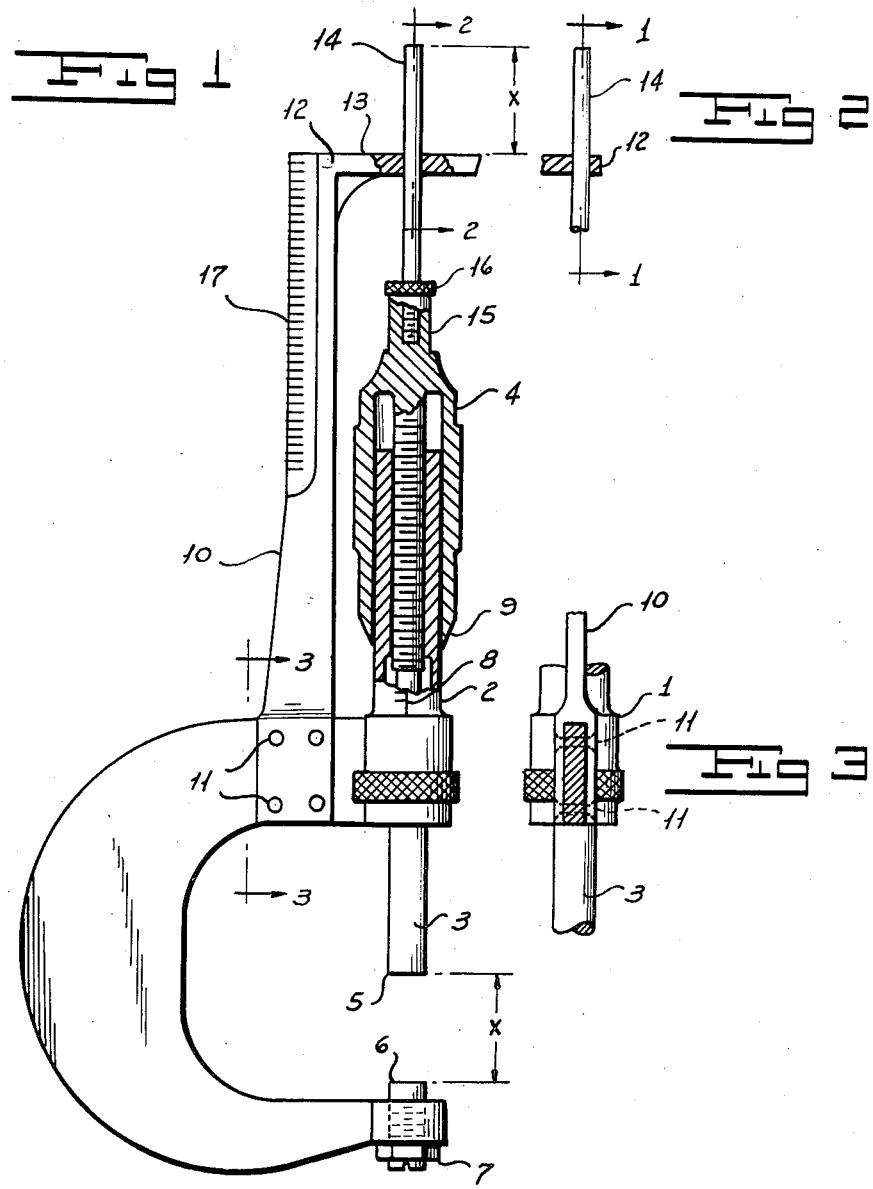
INVENTOR.
SERAFIM SAWIJALOW
BY
ATTORNEY

United States Patent Office 2,704,403
Patented Mar. 22, 1955

2,704,403

COMBINED MICROMETER GAUGE AND DEPTH GAUGE

Serafim Sawijalow, Brooklyn, N. Y.

Application February 19, 1953, Serial No. 337,757

3 Claims. (Cl. 33—167)

This invention is a combined micrometer gauge and depth gauge capable of measuring the thickness of articles positioned between its measuring faces in the usual manner and also capable of measuring depth of holes, recesses or offsets, while utilizing the scales common to a conventional micrometer gauge.

Such gauges have heretofore been suggested, but have not met with favor because of their complicated nature and because of the separate parts or accessories required for carrying out the multiple purposes of these tools.

The object of the present invention is to provide a greatly simplified and novel unitary construction which is absolutely accurate when used for the measuring of both depth and thickness.

In the preferred form of the present invention, there is permanently secured to the adjustable screw of a conventional micrometer, a depth rod operating through an extension of the U-shaped yoke of the micrometer. That extension carries a measuring face of the resulting depth gauge. The conventional reading scales of the micrometer and thimble give accurate readings for both depth gauge and the micrometer.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is a side elevation of a tool embodying the present invention showing the extension partly in section on the line 1—1 of Fig. 2.

Fig. 2 is a fragmental section taken on the plane of the line 2—2 of Fig. 1.

Fig. 3 is a fragmental section taken on the line 3—3 of Fig. 1.

Referring to the drawings, 1 designates the usual U-shaped yoke of the micrometer. One arm of the yoke carries the usual integral tubular column 2 through which the screw 3 is longitudinally adjusted by rotating the thimble 4 in order to engage the measuring face 5 of the screw with one surface of the article to be measured, while the opposite surface of the article is in contact with the other measuring face 6 of a micrometer. The latter measuring face is adjustable in the usual manner and may be locked in adjustment by a lock nut 7. A longitudinal scale 8 is formed on the column 2 and is adapted for cooperation with a circumferential scale 9 formed on the lower end of the thimble. The parts thus far described are purely conventional and are common to micrometer gauge construction.

In incorporating the present invention in such a micrometer gauge, the yoke 1 is provided with a bracket extension 10 which, in practice, may be formed integral with the yoke, although it is preferably made separate and rigidly secured thereto as shown in the drawings. I find it convenient to make the bracket with a forked lower end adapted to straddle one arm of the yoke and secure this forked end to the yoke by means of rivets 11, as best shown in Fig. 3 or by one or more screws, so that said bracket may be removed, if desired. The yoke 1 and the bracket extension 10 combined constitute a frame which supports all other parts of the structure.

The bracket conveniently extends substantially parallel to the screw 3 and is provided at its outboard end with a laterally extending arm 12, the outer surface 13 of which constitutes the measuring face of the depth gauge. This measuring face 13 is in a plane perpendicular to the axis of the thimble. The arm 12 is adapted to overlie the end of the thimble 4 and is perforated for the passage of a depth rod 14, the axis of which is also perpendicular to the face 13. The depth rod extends into a cylindrical part 15 formed on and axially of the thimble 4 or frictionally secured thereto, as in some conventional micrometers. This boss, which is referred to as such to cover both structures, is internally threaded and the depth rod 14 is complementarily threaded to screw into the boss and, when properly adjusted, is locked in place by a lock nut 16.

The threading of the depth rod 14 into the boss 15 permits of its axial adjustment, so that the gap X' between the free end of the depth rod 14 and the measuring face 13 will be identical with the gap X between the measuring faces 5 and 6 of the micrometer. When thus adjusted, the lock nut 16 is tightened to lock the parts in adjustment.

It will be noted from Fig. 2 that the perforation in the arm 12 is much nearer to one edge of that arm than to the other edge. The purpose of this construction is to permit the arm to be made sufficiently wide to impart the desired strength and yet position the depth rod sufficiently close to one edge to permit depth measurements from surfaces which have little lateral clearance for use of the tool.

The graduations 17, shown along the back edge of the bracket 10, may be in the nature of inches or centimeters or fractions thereof. The tool may be equipped with such graduations or not, as desired.

The tool of this invention is relatively simple in construction and requires no attachable and detachable parts as all parts of the tool are permanently secured to one another to be handled as a unit. They are not in the nature of accessories. They constitute part and parcel of the complete tool which can be used as such for the measurement of either thickness or depth without any change thereof.

The foregoing detailed description sets forth the invention in its preferred practical form, but the invention is to be understood as fully commensurate with the appended claims.

Having thus fully described the invention, what I claim as new and desire to secure by Letters Patent is:

1. A combined micrometer thickness and depth gauge comprising: a yoke provided at one end with a hub and at its opposite end with an alined anvil, a tubular column rigid with the hub and coaxial therewith, a measuring screw extending through the column and threaded with respect thereto, a thimble embracing said column and secured to the screw to rotate the screw when the thimble is rotated, a bracket supported on the yoke and extending therefrom in the same direction as the column and provided beyond the ends of the column and thimble with a measuring surface perpendicular to the axis of the screw and having therein an opening coaxial with said screw, a depth rod coaxial with the screw and rigidly secured to the end of the thimble remote from the yoke, said measuring rod being of such length that it will at all times extend beyond the measuring surface of the bracket a distance equal to the distance between the screw and the anvil, and juxtaposed cooperative longitudinal and annular scales on the column and thimble respectively, whereby said scales will identically indicate both thickness and depth measurements.

2. A combined micrometer thickness and depth gauge according to claim 1, wherein the bracket is made separate from the yoke and rigidly attached thereto.

3. A combined micrometer thickness and depth gauge according to claim 1, wherein the depth rod is mounted for axial regulation on its supporting thimble to calibrate its extending length.

References Cited in the file of this patent

UNITED STATES PATENTS

| Number | Name | Date |
|---|---|---|
| 515,234 | Lavigne | Feb. 20, 1894 |
| 597,335 | Spaulding | Jan. 11, 1898 |
| 1,589,462 | De Ghetto | June 22, 1926 |
| 1,603,663 | Cooper | Oct. 19, 1926 |
| 1,737,764 | Jacobs | Dec. 3, 1929 |